Nov. 27, 1923 1,475,452
E. SEITZ
MACHINE FOR THE AUTOMATIC SPREADING AND FILLING OF WAFFLE LEAVES
ONE ABOVE THE OTHER
Filed Feb. 9, 1921 2 Sheets-Sheet 1
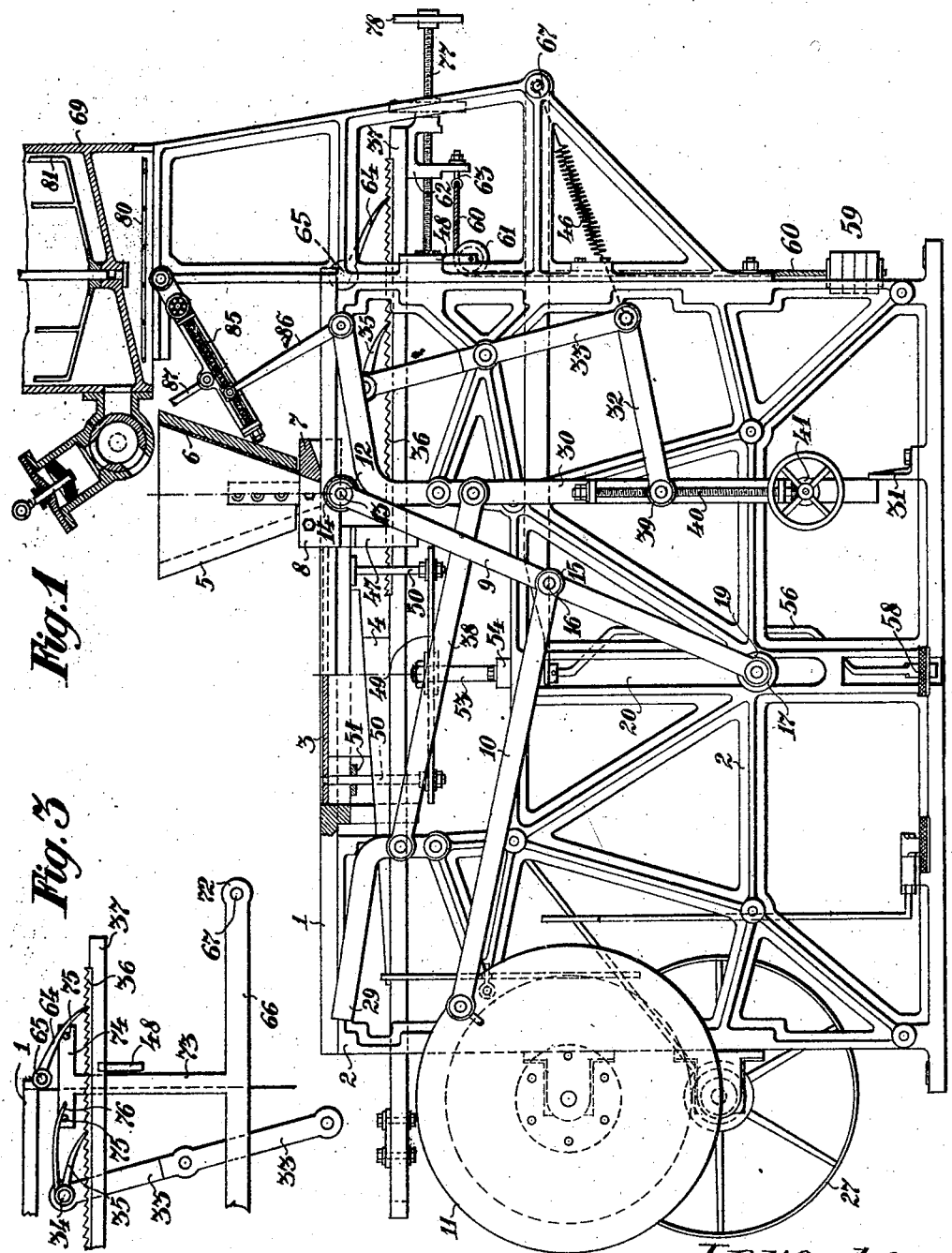
Inventor
E. Seitz,
By Markob Clerk
Attorneys

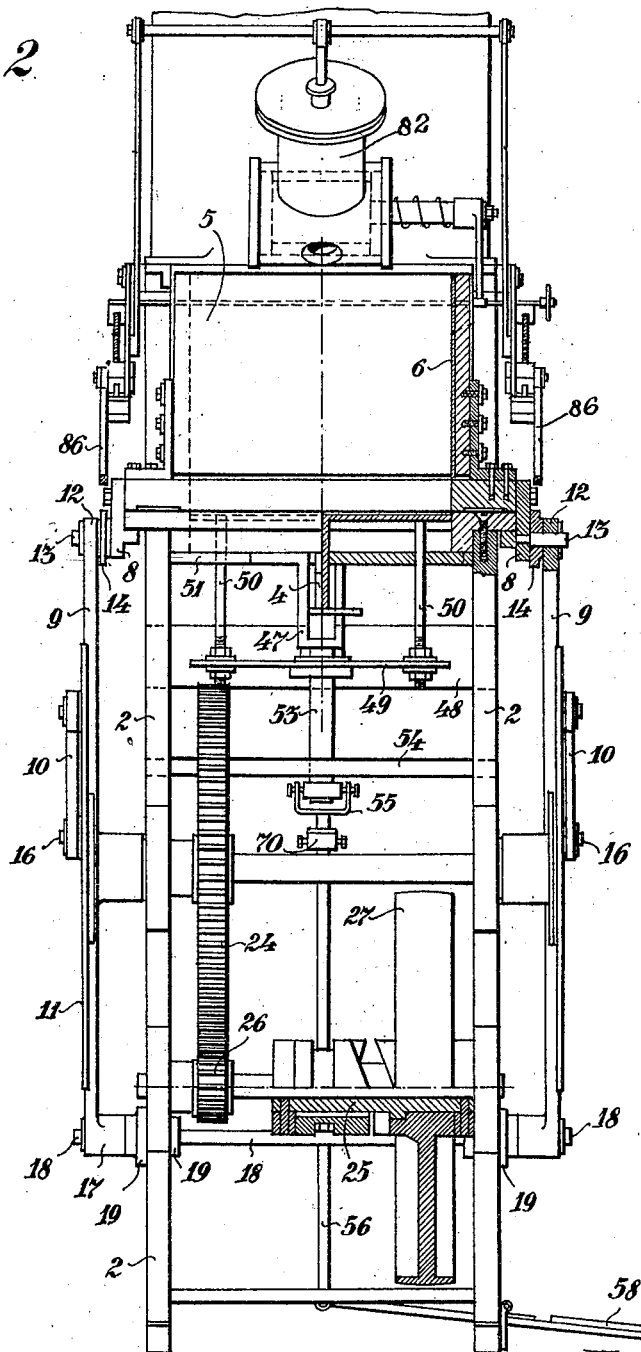

Patented Nov. 27, 1923.

1,475,452

UNITED STATES PATENT OFFICE.

EUGEN SEITZ, OF BUDAPEST, HUNGARY.

MACHINE FOR THE AUTOMATIC SPREADING AND FILLING OF WAFFLE LEAVES ONE ABOVE THE OTHER.

Application filed February 9, 1921. Serial No. 443,721.

(GRANTED UNDER THE PROVISIONS OF THE ACT OF MARCH 3, 1921, 41 STAT. L., 1313.)

*To all whom it may concern:*

Be it known that I, EUGEN SEITZ, a subject of the King of Hungary, residing at Budapest, in the Kingdom of Hungary, have invented certain new and useful Improvements in Machines for the Automatic Spreading and Filling of Waffle Leaves One Above the Other (for which I have filed applications in Hungary, Mar. 31, 1914, Patent No. 711,112, and in Germany Mar. 28, 1914, Patent No. 313,695), of which the following is a specification.

This invention relates to improvements in machines for spreading coating or filling material on wafers or plates such, for instance, as waffle leaves and the invention has for its object to provide a machine which permits of the wafers or plates to be coated with any desired mass and stacked one above the other with great rapidity and economy of material and power consumption and by which broken wafers may also be covered and the thickness of the layer of material varied as desired.

The machine consists essentially of a slide provided with a hopper for supplying the material which is reciprocally actuated from the power source above a wafer plate receiving cavity provided in the work table, the reciprocation of the slide automatically effecting step by step variations in the depth of the cavity for the production of cakes of varying thickness.

With these and other objects in view the invention consists in the novel combination and arrangement of parts hereinafter described in detail, illustrated in the accompanying drawing and more particularly pointed out in the appended claims.

In the accompanying drawing:

Figure 1 is a side elevation of the machine partly in section; and,

Fig. 2 is a front elevation thereof, partly in section.

Fig. 3 is an enlarged fragmentary detail of a part of the machine.

Referring to the drawing in detail, the machine comprises a work table 1 which is supported on the frame structure 2 constituting a base. A cavity in which the wafer plates are placed preliminary to the application of the paste or other material thereto is provided in the work table and a plate 3 is guided vertically in the cavity and its position may be varied by adjustment of the wedge 4 upon which said plate is supported. A hopper 5 having a suitable lining 6 is arranged on a slide 7 mounted on the work table 1 and in which the material to be applied to the wafer plates is contained.

The slide 7 is provided with side members 8 which engage the work table and guide the movement of the slide.

The slide 7 is positively actuated longitudinally by two rods 9 and connecting rods 10, the latter being connected to a disk 11 actuated from a suitable source of power. The upper ends 12 of the rods are connected with the slides 7 by two pins 13 which latter support pressure rollers 14 confined between the extremities of the rods and the slide. The central apertured portions 15 of the rods are pivotally connected with the connecting rods 10 at 16. The lower rod ends 17 are connected together by a shaft 18 upon which are mounted two guide rollers 19 which latter are mounted to travel between tracks 20 provided on the frame structure 2 and thereby insure vertical movement of the lower extremities of the rods 9.

The disk 11 receives movement through a suitable gear 24, 26 and through a belt pulley 27.

Two angle levers 29 and 30 connected together by rods 38 are arranged in pairs on each side of the base, the stroke of the lower arm of each lever 30 being limited by a contact member 31. The angle levers 30 are connected with the levers 33 by rods 32 and the upper ends of the levers 33 are provided with a pawl 35 engaging a ratchet bar 36 carried by the draw rod 37 which latter is slidable in supports 47 and guided in a recess in a contact member 48.

A cross head 39 attached to the lever 30 is actuated by means of a screw bolt 40 which, in turn, is actuated by the bevel gears 41. The pivoted extremities of the rods 32 and levers 33 are connected with a contractile spring 46, the opposite extremity of which is connected at 67 with the frame structure 2. The upper plate 3 of the receiving cavity is connected with a lower plate 49 by means of connecting bolts 50 which pass through guides 51 secured to the work table between the two plates. The center bolt 53 is secured to the lower plate 49 and passes through a guide element 54 attached to the base. At its lower end, the center bolt is connected through a universal joint 55 with a medial offset lever rod 56 which latter is connected with any preferred type of foot pedal 58.

A guide pulley 61 is supported in the frame structure 2 and partially supports a cable 60 having a weight 59 attached to one end and connected at its opposite end at 63 to a depending bracket 62 carried by the draw rod 37. A pawl 64 is pivotally attached at 65 to the table 1 and is movable over the teeth of a ratchet bar 36. A set screw 77 is threaded in the bracket 62 and is engaged at one end with a plate 48 and provided at its opposite end with a handle 78.

A suitable type of force feed mechanism 82 for the filling material is constructed and arranged to deliver material into the open upper end of the movable hopper 5 in predetermined quantities and the force feed device is connected with a main reservoir 69 preferably equipped with an agitator 81 and a heater 80. The force feed device may be actuated by the angular lever 30 through suitable connections indicated at 86—85 and 87.

The operation of the machine is as follows:

The slide 7 carrying the hopper 5 therewith is reciprocated longitudinally of the table 1 during rotation of the disk 11 through the rods 9 and 10. When the slide moves across the cavity in which the wafer plate is located, the material is spread over the wafer plate and as the slide approaches the limit of its travel to the left, in Fig. 1, the rollers 14 engage and depress the upwardly inclined portions of the levers 29 thereby exerting a pull on the rods 38 which transmit the movement of the levers 29 to the rods 30 and thence through the rods 32 to the levers 33. The disposition of the several levers and rods is such that during depression of the upper extremities of the levers 29 the upper extremities of the levers 33 are moved to the right, in Fig. 1, and the pawl 35 coacting with the teeth of the ratchet bar 36 shift the wedge 4 and, owing to the angle of inclination of the upper face of the latter, the plate 3 drops a distance, according to the extent of movement of the wedge 4. The stroke of the lever 33 may be varied with respect to the stroke of the lever 30 by proper adjustment of the cross head 39 through the screws 40 and accordingly the length of each individual movement of the ratchet bar and wedge 4 may be varied as desired, such variation in the length of the step by step movement of the ratchet bar 39 varying the extent of each step movement of the plate 3. During the return of the slide 7 to the right, the contractile spring 46 returns the several members 33, 22, 30, 38 and 29 to initial position, the pawl 35 riding over the teeth of the ratchet bar 36 and the pawl 64 preventing displacement of said ratchet bar.

When a stack or any desired number of wafer plates have been filled, one on top of the other, the wedge 4 and plate 3 are returned to initial position by actuating the pedal 58 which, through the rod 56 and center bolt 53, raise the plates 3 and 49. Simultaneously with the return of the plates 33 and 49 to initial position, the wedge 4 is returned to its initial position by the pull exerted by the weight 69 and cable 60 on the draw rod 37.

The plate 3 even in its initial position, does not lie flush with the top face of the table 1 but lies in a plane a proper distance below the plane of the table whereby to accommodate the first wafer plate to be covered or coated and the initial position of the plate 3 with respect to the top face of the table 1 may be varied by proper manipulation of the screw 77 which, abutting the stop plate 48, is capable of shifting the draw rod 37 and the wedge 4 to the left so as to permit the plate 3 to descend to the desired position.

Having thus particularly described the nature of my invention, what I claim as new and desire to secure by Letters Patent of the United States is:—

1. A machine of the type described, a table having a cavity therein, a movable plate arranged in said cavity, a slide reciprocable over the table and cavity and having a discharge opening for material therein, a hopper supported on said slide, a wedge-shaped member supporting the plate and movable relatively thereto, means operating to effect a step by step movement of said wedge member in one direction, and means carried by said slide engageable with the first mentioned means to actuate the latter.

2. A machine of the type described comprising a table having a cavity therein, a plate movably mounted in said cavity, a wedge-shaped support for said plate movable relatively to the latter, means for elevating said plate independently of said support, a slide reciprocally mounted on said table movable across the cavity therein and having a discharge opening for material, a hopper mounted on said slide for containing material means for producing a step by step movement of the wedge-shaped support in one direction, actuating means for the first mentioned means carried by the slide operating when the latter approaches the limit of its travel in one direction, and means for automatically returning the wedge-shaped support to initial position.

In testimony whereof I have signed my name to this specification.

EUGEN SEITZ.